(12) United States Patent
Borba

(10) Patent No.: US 8,871,341 B2
(45) Date of Patent: Oct. 28, 2014

(54) POLYOLEFINS HAVING ONE OR MORE SURFACES MODIFIED TO IMPROVE ADHESION OF POLYISOCYANATE FUNCTIONAL ADHESIVES THERETO

(75) Inventor: Edivaldo Bibiano de Borba, Sao Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/876,224

(22) PCT Filed: Oct. 7, 2011

(86) PCT No.: PCT/BR2011/000365
§ 371 (c)(1),
(2), (4) Date: Mar. 27, 2013

(87) PCT Pub. No.: WO2012/058735
PCT Pub. Date: May 10, 2012

(65) Prior Publication Data
US 2013/0273356 A1    Oct. 17, 2013

Related U.S. Application Data

(60) Provisional application No. 61/408,681, filed on Nov. 1, 2010.

(51) Int. Cl.
*B32B 27/32* (2006.01)
*B32B 27/38* (2006.01)
*B32B 27/40* (2006.01)
*B32B 7/12* (2006.01)

(52) U.S. Cl.
USPC ..... 428/336; 428/354; 428/355 R; 428/423.1; 428/423.3

(58) Field of Classification Search
USPC ................ 428/336, 354, 355 R, 423.1, 423.3
See application file for complete search history.

(56) References Cited

U.S. PATENT DOCUMENTS

| | | |
|---|---|---|
| 4,374,237 A | 2/1983 | Berger et al. |
| 4,538,920 A | 9/1985 | Drake |
| 4,687,533 A | 8/1987 | Rizk et al. |
| 4,756,337 A * | 7/1988 | Settineri .................. 138/99 |
| 4,780,520 A | 10/1988 | Rizk et al. |
| 5,063,269 A | 11/1991 | Hung |
| 5,082,147 A | 1/1992 | Jacobs |
| 5,106,928 A | 4/1992 | Skoultchi et al. |
| 5,143,884 A | 9/1992 | Skoultchi et al. |
| 5,286,821 A | 2/1994 | Skoultchi et al. |
| 5,310,835 A | 5/1994 | Skoultchi et al. |
| 5,376,746 A | 12/1994 | Skoultchi et al. |
| 5,539,070 A | 7/1996 | Zharov et al. |
| 5,603,798 A | 2/1997 | Bhat |
| 5,616,796 A | 4/1997 | Pocius et al. |
| 5,621,143 A | 4/1997 | Pocius |
| 5,623,044 A | 4/1997 | Chiao |
| 5,681,910 A | 10/1997 | Pocius |
| 5,686,544 A | 11/1997 | Pocius |
| 5,690,780 A | 11/1997 | Zharov et al. |
| 5,691,065 A | 11/1997 | Zharov et al. |
| 5,718,977 A | 2/1998 | Pocius |
| 5,795,657 A | 8/1998 | Pocius et al. |
| 5,852,137 A | 12/1998 | Hsieh et al. |
| 5,976,305 A | 11/1999 | Bhat et al. |
| 6,015,475 A | 1/2000 | Hsieh et al. |
| 6,264,871 B1 | 7/2001 | Mullen et al. |
| 6,348,123 B1 | 2/2002 | Nakata et al. |
| 6,512,033 B1 | 1/2003 | Wu |
| 6,706,831 B2 | 3/2004 | Sonnenschein et al. |
| 6,710,145 B2 | 3/2004 | Sonnenschein et al. |
| 6,713,578 B2 | 3/2004 | Sonnenschein et al. |

(Continued)

FOREIGN PATENT DOCUMENTS

| | | |
|---|---|---|
| EP | 0654632 A2 | 5/1995 |
| EP | 1818381 A1 | 8/2007 |

(Continued)

OTHER PUBLICATIONS

International Search Report and Written Opinion dated Apr. 3, 2012; for Corresponding PCT Application No. PCT/BR2011/000365 filed Oct. 7, 2011.

(Continued)

*Primary Examiner* — Thao T. Tran
(74) *Attorney, Agent, or Firm* — The Dobrusin Law Firm, PC

(57) ABSTRACT

This invention relates to the modification of polyolefin structures, parts or components, used in assemblies to enhance the bonding of polar adhesives to surface of the polyolefin structures. Disclosed herein are novel articles comprising polyolefin structures having one or more surfaces modified according to the invention. The polyolefin structures have one or more surfaces with an epoxy resin layer disposed directly on the surface and then disposed on the epoxy resin layer is a layer of one or more compounds, oligomers or prepolymers having reactive isocyanate groups. The invention is also a method for modifying one or more surfaces of a polyolefin structure by successively depositing on the surfaces an epoxy resin layer disposed and a layer of one or more compounds, oligomers or prepolymers having reactive isocyanate groups. Also disclosed are kits of the modified polyolefin structures and one or more of adhesives or coatings having polar reactive groups. Further disclosed are methods of bonding the modified polyolefin structures to other substrates by contacting adhesives having polar reactive groups with the modified surfaces and the other substrates with the adhesive disposed therebetween. Also disclosed are coating methods which comprise contacting one or more coatings comprising polar reactive groups with the modified surfaces of the polyolefin structure.

17 Claims, No Drawings

(56) References Cited

U.S. PATENT DOCUMENTS

| | | | |
|---|---|---|---|
| 6,713,579 B2 | 3/2004 | Sonnenschein et al. | |
| 6,730,759 B2 | 5/2004 | Sonnenschein et al. | |
| 6,806,330 B1 | 10/2004 | Sonnenschein et al. | |
| 7,345,130 B2 | 3/2008 | Zhu et al. | |
| 7,507,779 B2 * | 3/2009 | Nagano et al. | 525/455 |
| 7,514,123 B2 * | 4/2009 | Onoyama et al. | 427/475 |
| 7,579,405 B2 * | 8/2009 | Ton-That et al. | 525/65 |
| 2002/0100550 A1 | 8/2002 | Mahdi et al. | |
| 2003/0152779 A1 * | 8/2003 | Kondo et al. | 428/424.2 |
| 2006/0061103 A1 | 3/2006 | Gronquist | |
| 2009/0041943 A1 * | 2/2009 | Ogawa et al. | 427/385.5 |

FOREIGN PATENT DOCUMENTS

| | | |
|---|---|---|
| FR | 2692276 A1 | 12/1993 |
| JP | 55155078 A | 12/1980 |
| JP | 2000-063768 A | 2/2000 |
| JP | 2003/213055 A | 7/2003 |
| JP | 2003-525958 A | 9/2003 |
| JP | 2003-287860 A | 10/2003 |
| JP | 2004-258643 A | 9/2004 |
| JP | 2005-320536 A | 11/2005 |
| JP | 2006/082465 A | 3/2006 |
| JP | 2006-172565 A | 6/2006 |
| JP | 2007-304913 A | 11/2007 |

OTHER PUBLICATIONS

Written Opinion of the International Preliminary Examining Authority dated Jan. 9, 2013; for Corresponding PCT Application No. PCT/BR2011/000365 filed Oct. 7, 2011.

International Preliminary Report on Patentability dated Feb. 11, 2013; for Corresponding PCT Application No. PCT/BR2011/000365 filed Oct. 7, 2011.

Awaja et al., Adhesion of Polymers; Progress in Polymer Science, 2009, pp. 948-968, vol. 34.

Basin, Advances in Understanding the Adhesion between Solid Substrates and Organic Coatings; Progress in Organic Coatings, 1984, pp. 213-250, vol. 12, the Netherlands.

Bosma, et al., A Quantitative Adhesion Test for Coated Plastics; Int. J. Adhesion and Adhesives, Apr. 1994, pp. 93-102, vol. 14, No. 2.

Changing Customer Dynamics: Chemistry and Light Vehicles, pp. 1-12, 2008.

Cheng et al., Surface Modification of Polymer Fibre by the New Atmospheric Pressure Cold Plasma Jet; Surface and Coatings Technology, 2006, pp. 6659-6665, vol. 200.

Chonghen et al., Thermoplastic Adhesive Bonding of Galvanized Steel to Polypropylene Composite and its Durability; Int. J. Adhesion and Adhesives, 2002, pp. 187-195, vol. 22.

Clemens, et al., How Do Chlorinated Poly(olefins) Promote Adhesion of Coatings to Poly(propylene)?; Progress in Organic Coatings, 1994, pp. 43-54, vol. 24.

Critchlow et al., Review of Surfaces Pretreatments for Titanium Alloys; Int. J. Adhesion and Adhesives, 1995, pp. 161-172, vol. 15, No. 3, Great Britain.

Hintze-Brüning et al., Coating of Untreated Polypropylene with Halogen Free Aqueous Materials; Progress in Organic Coatings, 2000, pp. 49-54, vol. 40.

Kohler et al., An Apparatus for Determining Both the Quantity of Gas Evolved and the Amount of Reagent Consumer in Reactions with Methyl Magnesium Iodide; J. of the American Chemical Society, p. 3181, vol. 49, 1927.

Lee, Adhesives and Sealants for Severe Environments; Int. J. Adhesion and Adhesives, Apr. 1987, pp. 81-91, vol. 7, No. 2.

Molitor, Surface Treatment of Titanium foe Adhesive Bonding to Polymer Composites: A Review; Int. J. Adhesion and Adhesives, 2001, pp. 129-136, vol. 21.

Mühlhan et al., Improvement of Bonding Properties of Polypropylene by Low-pressure Plamsa Treatment; Surface and Coatings Technology, 1999, pp. 783-787, vol. 116-19.

Murphy, Technical Developments in 2002: Organics Coatings, Processes, and Equipment; Metal Fishing, Feb. 2003, pp. 47-65, annual review.

Pinto et al., Shear Strength of Adhesively Bonded Polyolefins with Minimal Surface Preparation, Int. J. Adhesion and Adhesives, 2009, pp. 452-456, vol. 28.

Ryntz, Coating Adhesion to Low Surface Energy Substrates; Progress in Organic Coatings, 1994, pp. 73-83, vol. 25.

Sonnenschein et al., Poly(acrylate/siloxane) Hybrid Adhesives for Polymers with Low Surface Energy; Int. J. Adhesion and Adhesives, 2008, pp. 126-134, vol. 28.

Tod et al., use of Primers to Enhance Adhesive Bonds; Int. J. Adhesion and Adhesives, Jul. 1992, pp. 159-163, vol. 12, No. 3.

Wake, Theories of Adhesion and Uses of Adhesives: A Review; Polymer, Mar. 1978, pp. 291-308, vol. 19.

Wingfield, Treatment of Composite Surfaces for Adhesive Bonding; Int. J. Adhesion and Adhesives, Jul. 1993, pp. 156-156, vol. 13, No. 3.

Yang et al., Primers for Adhesive Bonding to Polyolefins; J. of Applied Polymer Science, 1993, pp. 359-370, vol. 48.

Japanese Office Action dated Jun. 3, 2014 for Japanese Application 2013-535210.

\* cited by examiner

US 8,871,341 B2

POLYOLEFINS HAVING ONE OR MORE SURFACES MODIFIED TO IMPROVE ADHESION OF POLYISOCYANATE FUNCTIONAL ADHESIVES THERETO

CLAIM OF BENEFIT OF FILING DATE

The present application is a national phase application of and claims the benefit of the PCT Application BR 2011/000365, filed Oct. 7, 2011 and Provisional Application 61/408,681, filed Nov. 1, 2010, the contents of which are hereby incorporated by reference in their entirety.

FIELD OF THE INVENTION

The present invention relates generally to polyolefin substrates having one or more surfaces modified to improve adhesion of the surface to polyisocyanate functional adhesives, to methods of preparing such modified polyolefin substrates and methods of bonding polyolefin substrates to other substrates utilizing isocyanate functional adhesives.

BACKGROUND OF THE INVENTION

Polyolefins, such as polyethylene and polypropylene, have become a preferred material for formed parts used in a variety of assembled products due to its balance of properties, ease of fabrication due to their thermoplastic nature, relatively low cost and polyolefin formulation technology which allows tailoring of their properties for certain uses. Polyolefins are used in a wide variety of industries such as automotive, furniture, electronics, toys, appliances and the like. The drawback with the use of polyolefins in assemblies of different materials is that polyolefins have low polarity on their surfaces which means that the coatings and adhesives preferred for use in industry based on polyisocyanate functional resins (polyurethanes) do not easily bond to polyolefins. In order to bond such materials to polyolefins, the polyolefin surface needs to be modified to facilitate bonding. It is well known to modify the surface of polyolefin parts to enhance adhesion to adhesives with polar groups. This is achieved by flame treatment, corona discharge treatment, etching physically or with chemicals or through the use of primers. Common primers used with polyolefins utilize chlorinated polymers or compounds, such as chlorinated polyolefins dissolved in non-polar solvents, Ryntz "Coating Adhesion to Low Surface Energy Substrates" Progress in Organic Coatings 25 (1994) pp 73-83. These methods require high capital investments, significant production floor space or present environmental concerns.

Recently acrylic based adhesive systems have been developed which bond well to low surface energy polymers such as polyolefins, see for example Skoultchi, U.S. Pat. Nos. 5,106,928; 5,143,884; 5,286,821; 5,310,835 and 5,376,746; Zharov et al., U.S. Pat. Nos. 5,539,070; 5,690,780 and 5,691,065; Pocius U.S. Pat. Nos. 5,616,796; 5,621,143; 5,681,910; 5,686,544; 5,718,977 and 5,795,657; and Sonnenschein et al. U.S. Pat. Nos. 6,806,330; 6,730,759; 6,706,831; 6,713,578; 6,713,579 and 6,710,145 (all incorporated herein by reference). These systems bond well to polyolefins and have been utilized commercially. In a commercial environment it is most efficient to cure these systems using ultraviolet light sources. The use of these systems are not as inexpensive as commercial epoxy resin and polyisocyanate functional group containing (polyurethane) systems. Thus many users of polyolefins based parts would prefer to use commercial polyisocyanate functional adhesive systems.

There have been attempts to develop other primer systems for polyolefin substrates, see Nakata et al. U.S. Pat. No. 6,348,123 and Iida JP, 2003213055A. It does not appear that these systems have achieved commercial success.

Components or parts prepared from polyolefins are often manufactured by component suppliers that sell and ship the components and parts to original equipment manufacturer that assemble components into sub-assemblies and final assemblies. Often the original equipment manufacturer requires that the part be assembly ready when received. This means that the surface of the polyolefin parts need to be modified by the component manufacturer in its plant and then shipped to the original equipment manufacturer. Thus it is important that the surface modification process allow for modification in a plant remote in time and place from the ultimate assembly plant. This requires that the surface once modified retain its ability to bond to common coatings or adhesives having polar functional groups when the parts are shipped to a different location for assembly.

What is needed is systems that facilitate the bonding of polar adhesive systems to polyolefins substrate surfaces. What is further needed is a system that facilitates modification of the surface in one location and the surface retains its ability to adhere to adhesives containing polar groups in another location at a time remote from the time of application.

SUMMARY OF THE INVENTION

The present invention is an article comprising: a polyolefin substrate; disposed on one of more surfaces of the polyolefin substrate is a layer comprising a resin containing reactive epoxy groups; and disposed on the epoxy resin layer is a layer of a composition containing one or more compounds, oligomers or prepolymers having reactive isocyanate groups. Preferably, the polyolefin substrate further comprises one or more reinforcing fibers, one or more fillers, one or more elastomers or mixtures thereof. Preferably polyolefins are polypropylene, polyethylene or mixtures thereof, with polypropylene more preferred.

In another embodiment the invention is a method of modifying the surface of a polyolefin substrate comprising: providing a polyolefin substrate; contacting one or more surfaces of the polyolefin substrate with a composition comprising one or more epoxy resins and one or more volatile solvents or dispersants and allowing the volatile solvent or dispersant to volatilize away from the surface of the polyolefin substrate upon which the epoxy resin composition is deposited so that a layer comprising one or more epoxy resins is deposited on the surface of the polyolefin substrate; applying to the layer of one or more epoxy resins a composition comprising one or more compounds, oligomers or prepolymers having reactive isocyanate groups and one or more volatile solvents or dispersants and allowing the volatile solvent or dispersant to volatilize away so that a layer comprising one or more compounds, oligomers or prepolymers having reactive isocyanate groups is deposited on the epoxy resin layer.

In another embodiment the invention is a method further comprising: applying a coating or an adhesive having polar functional groups to the surface of one or both of the polyolefin substrate having a layer comprising one or more compounds, oligomers or prepolymers having reactive isocyanate groups deposited on the epoxy resin layer or a second substrate; allowing the coating or adhesive to cure; wherein the coating or adhesive is contacted with the surface of the polyolefin substrate which has deposited thereon the layer of the epoxy resin and the layer of one or more compounds, oligomers or prepolymers having reactive isocyanate groups.

In yet another embodiment the invention is a method of bonding a polyolefin substrate to a second substrate comprising: preparing a polyolefin substrate having a layer comprising one or more compounds, oligomers or prepolymers having reactive isocyanate groups deposited on the epoxy resin layer; applying an adhesive having polar functional groups to the surface of one or both of the polyolefin substrate or a second substrate; contacting the polyolefin substrate and the second substrate with the adhesive disposed between the substrates; and allowing the adhesive to cure; wherein the adhesive is contacted with the surface of the polyolefin substrate which has deposited thereon the layer of the epoxy resin and the layer of one or more compounds, oligomers or prepolymers having reactive isocyanate groups.

The substrates of the invention and the methods of preparing and using them allow the utilization of commonly used compositions containing reactive moieties with polar groups such as isocyanates and active hydrogen containing groups. The substrates and the methods allow for application of the adhesion promoters in one location and contacting with adhesives and coatings in another location. The bond between the treated polyolefin surfaces and coatings or adhesives having polar reactive moieties exhibits good strength, preferably about 2.0 MPa or greater in lap shear testing according to test procedure SAE J1529 and after curing for 168 hours at 23° C. and 50 percent relative humidity, more preferably about 3.0 MPa or greater and most preferably about 4.0 MPa.

DETAILED DESCRIPTION

This invention relates to the modification of polyolefin structures, parts or components, used in assemblies to enhance the bonding of polar adhesives to one or more surfaces of the polyolefin structures. Disclosed herein are novel articles comprising polyolefin structures having one or more surfaces modified according to the invention. The polyolefin structures have one or more surfaces with a layer comprising one or more epoxy resins disposed directly on the surface and then disposed on the epoxy resin layer is a layer of one or more compounds, oligomers or prepolymers having reactive isocyanate groups. The invention is also a method for modifying one or more surfaces of a polyolefin structure by successively depositing on the surfaces a layer comprising one or more epoxy resins and a layer of one or more compounds, oligomers or prepolymers having reactive isocyanate groups. Also disclosed are kits of the modified polyolefin structures and one or more of adhesives or coatings having polar reactive groups. Further disclosed are methods of bonding the modified polyolefin structures to one another and/or other substrates by contacting adhesives having polar reactive groups with the one or more modified surfaces and/or other substrates with the adhesive disposed there between. Also disclosed are coating methods which comprise contacting one or more coatings comprising polar reactive groups with the modified surfaces of the polyolefin structure.

The articles of the invention as described hereinbefore may further include one or more of the following features in any combination: the polyolefin substrate further comprises one or more reinforcing fibers, one or more fillers or one or more elastomers or a mixture thereof; the epoxy resin layer has a dry thickness of about 1 µm to about 20 µm; the layer of the one or more compounds, oligomers or prepolymers having reactive isocyanate groups has a dry thickness of about 10 µm to about 25 µm; the layer of the one or more compounds, oligomers or prepolymers having reactive isocyanate groups further comprises a film forming resin; the epoxy resin comprises a bisphenol based epoxy resin; the epoxy resin comprises a bisphenol A based epoxy resin; the one or more compounds, oligomers or prepolymers having reactive isocyanate groups comprise di-isocyanate diphenyl methane. The kit of the invention as described hereinbefore may further include a primer for isocyanate functional adhesives. The methods of the invention may further comprise one of more of the following features in any combination: the surface of the polyolefin substrate which has deposited thereon the layer of the epoxy resin and the layer of one or more compounds, oligomers or prepolymers having reactive isocyanate groups is contacted with an adhesive; the adhesive is contacted with the surface of the polyolefin substrate which has deposited thereon the layer of the epoxy resin and the layer of one or more compounds, oligomers or prepolymers having reactive isocyanate groups or the second substrate; and the two substrates are contacted such that the adhesive is disposed between the two surfaces before the adhesive is allowed to cure; the time period between the application of the epoxy resin containing composition and application of the composition comprising one or more compounds, oligomers or prepolymers having reactive isocyanate groups and one or more volatile solvents is about 15 minutes and 820 minutes; the time period between applying the composition comprising one or more compounds, oligomers or prepolymers having reactive isocyanate groups and one or more volatile solvents and contacting the coating or adhesive with the surface of the polyolefin substrate is about 30 minutes to about 110 hours; the epoxy resin composition is applied at a wet thickness of about 10 µm to about 90 µm; the composition comprising one or more compounds, oligomers or prepolymers having reactive isocyanate groups and one or more volatile solvents is applied at a wet thickness of about 20 µm to about 150 µm; the polyolefin substrate further comprises one or more reinforcing fibers, one or more fillers or one or more elastomers or a mixture thereof; the layer of the one or more compounds, oligomers or prepolymers having reactive isocyanate groups further comprises a film forming resin; the epoxy resin comprises a bisphenol based epoxy resin; the epoxy resin comprises a bisphenol A based epoxy resin; the one or more compounds, oligomers or prepolymers having reactive isocyanate groups comprise di-isocyanate diphenyl methane; the substrate is transported from one location to another between the application of the composition comprising one or more compounds, oligomers or prepolymers having reactive isocyanate groups and one or more volatile solvents or dispersants and contacting the polyolefin substrate with the adhesive; the adhesive contains polar groups comprising isocyanate groups, epoxy groups or a combination thereof; and wherein the adhesive contains polar groups comprising isocyanate groups.

"One or more" as used herein means that at least one, or more than one, of the recited components may be used as disclosed. "Nominal" as used with respect to functionality means the theoretical functionality, generally this can be calculated from the stoichiometry of the ingredients used. Generally, the actual functionality is different due to imperfections in raw material, incomplete conversion of the reactants and formation of by-products. "Link up" means to bond to the surface adjacent to the specified material. "Open time" as used herein refers to the time from application of a primer system wherein the primer system is capable of linking up to an isocyanate functional adhesive. In a preferred embodiment, the open time starts when the solvent of the primer system has volatilized away after application to a substrate and ends when the part of the composition remaining on the surface of the substrate is no longer able to link up to the adhesive system. Evidence of the failure to link the adhesive to the primer system is adhesive failure from the surface of the primed surface in performance testing as described hereinafter. Link up as used herein refers to the ability of the primer system to chemically react with the adhesive or coating system to form chemical bonds. Evidence of link up is demonstrated by cohesive failure in performance testing as described hereinafter. Surface treatment as used with respect to low surface energy plastics means treatment of the surface to oxidize the surface to create additional polar groups on the surface of the plastic. This can be achieved by treatment of the surface by chemical etching, flame treatment, corona discharge and the like. By low surface energy substrates (plastics) is meant materials that have a surface energy of about 45 $mJ/m^2$ or less, more preferably about 40 $mJ/m^2$ or less and most preferably about 35 $mJ/m^2$ or less. Included among such materials are polyethylene, polypropylene, and olefin containing block co-polymers which has a surface energy of less than about 20 $mJ/m^2$. (The expression "surface energy" is often used synonymously with "critical wetting tension" by others.) High or higher energy surface means that the surface has a significant number of polar groups on the surface to allow an adhesive system to bond to the surface (link up to the surface).

The polyolefin is a homopolymer of an α-olefin or a copolymer of an α-olefin with another compound containing one or more unsaturated groups (e.g. a copolymer of two α-olefins). An a-olefin is a straight or branched chain compound having an unsaturated group at one end of chain. Among preferred α-olefins are $C_{1-12}$ alkylenes, more preferable α-olefins include ethylene, propylene and butylenes, with ethylene and propylene most preferred. For example the polyolefin may be an ethylene or propylene containing polymer or copolymer. Copolymers can be any type of copolymer, e.g. without limitation, they may be random copolymers, block copolymers, or alternating copolymers. Among useful polyolefins are blends of one or more polyolefins, for example polypropylene and polyethylene, and blends of one or more polyolefins with one or more of other known thermoplastic polymers, such as polyamide, polyethylene terephthalate, polybutylene terephthalate, polystyrene, a styrene block copolymer, a copolymer of styrene and acrylonitrile, a terpolymer of styrene, acrylonitrile and butadiene, polyphenylene oxide, polyacetal, polyetherimide, polycarbonate, or mixtures thereof. The blends of one or more polyolefins with other known thermoplastic polymers preferably contain about 50 percent by weight or greater of the polyolefins, more preferably 75 percent by weight or greater and most preferably about 90 percent by weight of greater. Examples of preferred ethylene copolymers include copolymers containing ethylene monomers and a second α-olefin which has from about 3 to about 12 carbon atoms. Examples of preferred propylene copolymers include copolymers containing propylene monomers and a second, different α-olefin which has from about 2 to about 12 carbon atoms. In one aspect of the invention, the polyolefin comprises or consists essentially of a propylene copolymer (e.g. a random copolymer) containing from about 2 to about 30 weight percent ethylene, more preferably from about 10 to 25 weight percent ethylene, based on the total weight of the polyolefin. The polyolefin may be characterized by a weight average molecular weight. The weight average molecular weight of the polyolefin may be greater than about 5,000, preferably greater than about 20,000 and more preferably greater than about 100,000. The weight average molecular weight of the polyolefin may be less than about 5,000,000, preferably less than about 1,000,000 and more preferably less than about 500,000. The most preferred polyolefin is polypropylene.

The polyolefins useful in the structures of the invention may further comprise one of more reinforcing materials, for example reinforcing fibers, fillers or impact modifiers. These materials are typically utilized to adjust the basic properties of polyolefins to meet the property requirements of particular customers or uses of the structures. The particular materials chosen and amounts of such materials are chosen to provide the desired properties of the structures. Reinforcing materials are typically utilized to improve the strength of the polyolefin structures. Any reinforcing materials and any amount of reinforcing materials which improve the strength of the polyolefin structures may be utilized in the polyolefin structures of the invention. The reinforcement material can include particles, chopped materials, strands, combinations thereof, or the like. Preferably, the reinforcement material includes fibers and more preferably includes fibers of glass, carbon, nylon, graphite, polyester, polyamides (e.g. aramides) and mixtures thereof. The amount of fibers is chosen to provide the desired properties of the polyolefin structures. The amount of the fibers is generally up to about 50 parts by weight, and desirably from about 10 to about 30 parts by weight for every 100 parts by weight of the polyolefin's structure.

The polyolefin structures may further contain fillers. Fillers are utilized to adjust the properties and/or to lower the cost of the polyolefin structures. Any filler known in the art which provides the desired properties and cost and which are capable of being dispersed in the polyolefin substrate may be used. Preferably the fillers are dispersed uniformly throughout the polyolefin substrates. The filler material can comprise multiple different fillers or one singular filler material. Preferred fillers include one or more of clay, calcium carbonate, talc, kaolin, mica, wollastonite, hollow glass beads, titanium oxide, silica, carbon black, potassium titanate, silicate material, nanocomposites, combinations thereof or the like which can take the form of powders, platelets or otherwise. In one preferred embodiment, it is contemplated that the filler be comprised substantially entirely of mineral filler, particularly talc. One preferred talc is a powdered talc sold under the tradename Mistron®, which is commercially available from Luzenac. One preferred class of talc filled polypropylenes compound are sold under the tradename INSPIRE (DTF3800, TF1500SC, DTF1600S, or DTF2502.02ESU), which are commercially available from The Dow Chemical Company, Midland, Mich. Ignition resistance fillers may be used and include antimony oxide, decabromobiphenyl oxide, alumina trihydrate, magnesium hydroxide, borates, and halogenated compounds. Of these ignition resistant fillers, alumina trihydrate and magnesium hydroxide are preferred. The polyolefin structures are preferably filled with fillers in an amount of about 0.10 percent by weight or greater, more preferably about 0.50 percent by weight or greater and about 1.0 percent by weight or greater. The polyolefin structures are preferably filled with talc in an amount of about 35.0 percent by weight or less; more preferably to about 30.0 percent by weight or less; and most preferably to about 25.0 percent by weight or less.

The polyolefin structures may further comprise impact modifiers. Any impact modifier which provides the desired properties and which can be dispersed in the polyolefin structures may be utilized herein. Impact modifiers are typically elastomers such as natural rubber, polyisoprene rubber, styrene-butadiene rubber, polybutadiene rubber, nitrite rubber, butyl rubber, ethylene-propylene-diene rubber (EPDM), ethylene-propylene, ethylene-hexene, and ethylene-octene copolymers, and other elastomers known in the art. Minor amounts of impact modifiers can alter the impact strength of the polyolefin structures. Non-limiting examples of such elastomers are those commercially available from multinational companies such as Bayer, Dow Chemical, Uniroyal Chemical, ExxonMobil, and others. ENGAGE™ 8180, ENGAGE™ 8842, and other ENGAGE™ polyolefin elastomers are especially preferred ethylene-octene copolymers available from The Dow Chemical Company of Midland, Mich. The impact modifiers may be utilized in an amount to provide the desired properties. Preferably the impact modifiers are present in an amount of about 60 percent by weight or less, more particularly about 50 percent by weight or less, and more specifically about 25 percent by weight or less based on the weight of the polyolefin structures. Preferably the impact modifiers are present in an amount of about 1 percent by weight or more, more typically about 7 percent by weight or more and still more typically about 10 percent by weight or more of the polymeric material based on the weight of the polyolefin structures.

The polyolefin structures may include a variety of other additives such as surfactants, flexibilizers, ignition resistant additives, stabilizers, colorants, antioxidants, antistats, slip-aids (i.e., slip resistance aid), flow enhancers, nucleating agents, including clarifying agents, etc. The amounts of such additives that may be utilized are well known to those skilled in the art. For example, it will be understood that one or more pigments or colorants may be added to the polymeric composition such that the parts or components are "molded-in-color." Preferred examples of additives are ignition resistance additives, such as, but not limited to halogenated hydrocarbons, halogenated carbonate oligomers, halogenated diglycidyl ethers, organo-phosphorous compounds, fluorinated olefins, antimony oxide and metal salts of aromatic sulfur, or a mixture thereof may be used. Further, compounds which stabilize thermoplastic compositions against degradation caused by, but not limited to heat, light, and oxygen, or a mixture thereof may be used. One class of additives is antioxidants, which may be included in a relatively small weight percentage of the polymeric composition (e.g., less than about 1 or 2 weight percent). One preferred antioxidant is IRGANOX B225 antioxidant commercially available from Ciba Specialty Chemicals Corporation which is a blend of 1 part Irganox 1010 antioxidant (Tetrakis (methylene(3,5-di-t-butyl-4-hydroxyhydrocinnamate))methane) and 1 part Irgafos 168 tris(2,4-t-butylphenyl) phosphite. Another additive is a demolding agent (e.g., a wax, mold release or slip-aid). Exemplary demolding agents are nitrogen or ammonia group containing compound such as an amine or an amide, such as ethylene bis-stearamide (EBS) and erucamide (wax) sold under the tradename KENAMIDE ULTRA E, commercially available from Chemtura Corporation, Middlebury, Conn. Exemplary mold release agents include "stearates" such as glycerol monostearate commercially available from Danisco or Ciba Specialty Chemicals under the tradename Atmer.

The polyolefins may be formed into the desired structures by any known means for forming structures from thermoplastic materials. Among preferred methods of forming the polyolefin structures of the invention include as injection molding, sheet forming, extrusion molding, vacuum molding, profile molding, foam molding, injection pressing, blow molding, thermoforming, compression molding, rotational molding, extrusion, or the like. The polyolefin structures of the invention can be used in any application wherein polyolefin components are used, including those where the polyolefin structures are components of assemblies. They can be used with other polyolefin parts or with parts of dissimilar materials. The polyolefin structures can be used in applications wherein they are coated, especially with a coating having reactive polar substrates. The polyolefin) structures can be used in toys, appliances, furniture, electronics, transportation vehicles and the like. Preferred applications are in the transportation arena, such as land vehicles, boats or aircraft, with automotive vehicles (e.g. cars, trucks, buses, etc.) being the most preferred area of application. Within an automotive vehicle it is possible to use the materials of the present invention as vehicle trim components, bumper facia, body panels, wheel wells, underbody panels, interior trim components, deck lids, seat components, handles, cargo liners, instrument panels, engine compartment components, and the like. Also possible hybrid articles might be made by combining the materials of the present invention with a different material in a layered combination. Other materials may include metals, plastics, ceramics, glass, wood, combinations thereof or the like. Such other materials may be coated or uncoated.

Deposited on one or more surfaces of the polyolefin structure are two layers. Deposited directly on one or more of the surfaces of the polyolefin structure is a layer comprising one or more epoxy resins. Deposited on the epoxy resin layer is a layer of one or more compounds, oligomers or prepolymers having reactive isocyanate groups. The two layers are deposited on any of the surfaces of the polyolefin structure to which one of more compositions containing polar reactive groups may be adhered.

The epoxy resin layer may comprise one or more of the epoxy resins described hereinafter. The epoxy resin may further contain one or more ingredients known to those skilled in the epoxy compositions such as adhesion promoters or modifiers, film forming resins, fillers, stabilizers, anti-oxidants and catalysts The layer of one or more compounds, oligomers or prepolymers having reactive isocyanate groups comprises one or more compounds, oligomers, prepolymers or mixture thereof that can form a film and can react with polar reactive groups. Such compounds, oligomers, prepolymers or mixture thereof generally comprise the polyisocyanates described hereinafter, oligomers prepared therefrom or prepolymers prepared therefrom. The layer of one or more compounds, oligomers or prepolymers having reactive isocyanate groups may further comprise one or more film forming resins, one or more fillers, stabilizers, antioxidants, stabilizers, catalysts and the like. The layer of one or more compounds, oligomers or prepolymers having reactive isocyanate groups is deposited on the epoxy resin layer. The layer has sufficient thickness to bond with the epoxy resin layer and the material containing reactive polar groups. The layer of one or more compounds, oligomers or prepolymers having reactive isocyanate groups also has a sufficient thickness to provide the desired strength of the adhesion of the polyolefin substrate surface to the material having polar reactive groups.

Disclosed herein is a method of modifying one or more surfaces of a polyolefin structure to enhance the ability of the surface of the polyolefin structure to bond to a material having reactive polar groups. In general this method comprises depositing a layer comprising one or more epoxy resins on the surface of the polyolefin structure and thereafter depositing a layer comprising one or more compounds, oligomers or prepolymers having reactive isocyanate groups on the layer of the composition comprising one or more epoxy resin deposited on the surface of the polyolefin structure. Preferably the process comprises applying a composition comprising one or more epoxy resins in one or more volatile solvents on the surface of the polyolefin structure; allowing the volatile solvents to volatilize away from the surface of the polyolefin substrate so as to form a layer comprising the one or more epoxy resins; applying to the layer comprising one or more epoxy resins deposited on the polyolefin substrate a composition comprising one or more compounds, oligomers or prepolymers having reactive isocyanate groups and one or more volatile solvents or dispersants; allowing the one or more volatile solvents to volatilize away from the surface of the polyolefin structure so as to form a layer comprising one or more compounds, oligomers or prepolymers having reactive isocyanate groups. The removal of the one or more solvents or dispersants may be enhanced by any known operation or condition which enhances the volatilization of solvents or dispersants and/or the removal of the solvents or dispersants from the vicinity of the polyolefin structure. Such operations may include one or more of the following: applying a vacuum; flowing a fluid (preferably a gas) over or by the polyolefin substrate; heating the polyolefin substrate; performing the operation in a ventilated location; and the like. The layers may be applied by any means which is capable of depositing a layer of the desired thickness on the surface of the polyolefin structure including spraying, brushing, coating, pouring and the like. Once deposited on the surface any excess of the deposited composition may be removed to form a layer of the desired thickness. Methods for removing the excess coating are well known in the art. The epoxy resin layer has a sufficient thickness to enhance adhesion to the polyolefin substrate and to the layer of one or more compounds, oligomers or prepolymers having reactive isocyanate groups. The epoxy resin layer also has a sufficient thickness to provide the desired strength of the adhesion of the polyolefin substrate surface to the material having polar reactive groups. Preferably the wet thickness of the epoxy resin layer is about 10 μm or greater, more preferably about 40 μm or greater and most preferably about 60 μm or greater. Preferably the wet thickness of the epoxy resin layer is about 150 μm or less, more preferably about 90 μm or less and most preferably about 70 μm or less. Preferably the dry thickness of the composition comprising one or more epoxy resins and one or more solvents and dispersants applied is about 1 μm or greater, more preferably about 4 μm or greater and most preferably about 8 μm or greater. Preferably the dry thickness of the composition comprising one or more epoxy resins and one or more solvents and dispersants applied is about 20 μm or less, more preferably about 15 μm or less and most preferably about 10 μm or less. The epoxy resin composition applied to the surface of the polyolefin structure comprises one or more epoxy resins and one or more volatile solvents or dispersants. The epoxy resins useful in the composition include any epoxy resins that are capable of forming a discrete layer on the surface of the polyolefin substrate and which are capable of adhering to the polyolefin structure surfaces and bonding to the layer containing isocyanate groups. Epoxy resins useful in the adhesive composition of the present invention can be any organic compound having at least one epoxy ring that is polymerizable by ring opening. Preferred epoxy resins are organic compounds having an average epoxy functionality greater than one, and preferably at least two. The epoxy resins can be monomeric or polymeric, and aliphatic, cycloaliphatic, heterocyclic, aromatic, or mixtures thereof. The more preferred epoxy resins are aromatic and contain more than 1.5 epoxy groups per molecule and most preferably more than 2 epoxy groups per molecule. Preferable epoxy resins have a molecular weight of about 150 to 10,000 and preferably from about 300 to 1,000. Preferable epoxy resins include linear polymeric epoxy resins having terminal epoxy groups (e.g., a diglycidyl ether of a polyoxyalkylene glycol), polymeric epoxy resins having skeletal epoxy groups (e.g., polybutadiene polyepoxy), and polymeric epoxy resins having pendant epoxy groups (e.g., a glycidyl methacrylate polymer or copolymer), and mixtures thereof. Preferred are aromatic glycidyl ethers such as those prepared by reacting a polyhydric phenol with an excess of epichlorohydrin. Examples of useful phenols include resorcinol, catechol, hydroquinone, and the polynuclear phenols including p,p'-di-hydroxydibenzyl, p,p'-dihydroxydiphenyl, p,p'-dihydroxydiphenyl sulfone, p,p'-dihydroxy-benzophenone, 2,2'-dihydroxy-1,1-dinaphthylmethane and the 2,2', 2,3', 2,4', 3,3', 3,4' and 4,4' isomers of dihydroxydiphenylmethane, dihydroxydiphenyldimethylmethane, dihydroxydiphenyl-ethylmethylmethane, dihydroxydiphenylmethylpropylmethane, dihydroxydiphenyl-ethylphenylmethane, dihydroxydiphenylpropylphenylmethane, dihydroxydiphenylbutyl-phenylmethane, di-hydroxydiphenyltolylmethane, dihydroxydiphenyltolylmethylmethane, dihydroxydiphenyldicyclohexylmethane, and dihydroxydiphenylcyclohexane. Also preferred are polyhydric phenolic formaldehyde condensation products as well as polyglycidyl ethers that contain as reactive groups only epoxy groups or hydroxy groups. Useful materials include diglycidyl ethers of bisphenol A and of novolac resins, such as described in "Handbook of Epoxy Resins" by Lee and Neville, McGraw-Hill Book Co., New York (1967), incorporated herein by reference. Epoxy resins with flexibilized backbones are also useful. Preferred epoxy resins are bisphenol based epoxy resins. Preferred materials include diglycidyl ethers of bisphenols, such as diglycidyl ethers of bisphenol A and diglycidyl ethers of bisphenol F, and most preferably diglycidyl ethers of bisphenol A, because of the desirable properties that these materials attain upon curing. Examples of commercially available epoxy resins useful in the invention include diglycidyl ethers of bisphenol A (e.g., those available under the trademarks EPON 828, EPON 1001, and EPONEX 1510 from Shell Chemical Company, and DER-331, DER-332, and DER-334 available from The Dow Chemical Company); diglycidyl ethers of bisphenol F (e.g., EPICLON™ 830 available from Dai Nippon Ink and Chemicals Inc.); silicone resins containing diglycidyl epoxy functionality; flame retardant epoxy resins (e.g., DER™ 580, a brominated bisphenol type epoxy resin available from The Dow Chemical Company; and 1,4-butanediol diglycidyl ethers. The amount of the epoxy resin in the composition applied is chosen such that a layer of epoxy resin can be reasonably efficiently deposited on the surface of the polyolefin structure. Preferably the amount of epoxy resin in the composition applied to the surface of the polyolefin structure is about 1 percent by weight or greater, more preferably about 2 percent by weight or greater and most preferably about 2.5 percent by weight or greater. Preferably the amount of epoxy resin in the composition applied to the surface of the polyolefin structure is about 10 percent by weight or less and most preferably about 4.5 percent by weight or less.

The one or more epoxy resins are dissolved or dispersed in one or more volatile solvents or dispersants. Volatile as used herein means that the solvent or dispersant volatilizes in a reasonably rapid manner after application of the composition containing epoxy resins to the surface of the polyolefin structure. The solvents or dispersants can be any liquid which dissolves the one or more epoxy resins or forms stable dispersion of the one or more epoxy resins, volatilizes in a reasonably rapid manner under application conditions and which does not interfere in adhesion of the one or more epoxy resins to the surface of the polyolefin substrate and to the layer comprising one or more compounds, oligomers or prepolymers having reactive isocyanate groups. Preferably the one or more solvents or dispersants are organic. Preferred organic solvents or dispersants include aromatic compounds, alkyl substituted aromatic compounds, (e.g. toluene, xylene), ketones, acetates, and the like. More preferred organic solvents include benzene, toluene and ethyl benzene. The solvent or dispersant is present in sufficient amount to dissolve or disperse the one or more epoxy resins. The solvent or dispersant is present in an amount such that it can volatilize away in a reasonably rapid manner after application and leave a discrete layer of one or more epoxy resins on the surface of the polyolefin structure. The amount of solvent or dispersant present in the solution or dispersion is about 90 percent by weight or greater and most preferably about 95 percent by weight or greater. The amount of solvent or dispersant present in the solution or dispersion is about 99 percent by weight or less, more preferably about 98 percent by weight or less and most preferably about 96 percent by weight or less.

The composition containing the one or more compounds, oligomers or prepolymers having reactive isocyanate groups deposited on the layer of one or more epoxy resins comprises one or more compounds, oligomers or prepolymers having reactive isocyanate groups and one or more volatile solvents or dispersants. The one or more compounds, oligomers or prepolymers having reactive isocyanate groups useful in this composition are compounds, oligomers, or prepolymers having reactive isocyanate groups which are reactive with the epoxy groups of the layer of one or more epoxy resins and with polar reactive groups. The one or more compounds, oligomers or prepolymers having reactive isocyanate groups useful in this composition either alone or in conjunction with one or more film forming resins are capable of forming a discrete layer. The one or more compounds, oligomers or prepolymers having reactive isocyanate groups can be in the form of an isocyanate functional prepolymer or in the form of a monomer or oligomer having on average greater than 1 isocyanate group, and preferably 2 or more isocyanate groups. Isocyanate functional prepolymers include any prepolymers prepared by reaction of an isocyanate functional compound with one or more compounds having on average more than one isocyanate reactive functional groups (active hydrogen containing groups), such as hydroxyl, amine, thiol, carboxyl and the like under conditions such that the prepolymer prepared have on average more than one isocyanate moiety (group) per molecule. Preferable polyisocyanates for use in this invention include aliphatic, cycloaliphatic, araliphatic, heterocyclic or aromatic polyisocyanates, or mixtures thereof. Preferably, the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and is most preferably no greater than about 3.0. Higher functionalities may also be used, but may cause excessive cross-linking, and result in a composition which is too viscous to handle and apply easily, and can cause the deposited layer to be brittle. Preferably, the equivalent weight of the polyisocyanate is at least about 100, more preferably at least about 110, and is most preferably at least about 120; and is preferably no greater than about 300, more preferably no greater than about 250, and is most preferably no greater than about 200. Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivates thereof. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanato-cyclohexyl) methane, and trimethyl hexamethylene diisocyanate. The most preferred isocyanate is diphenyl methane diisocyanate. The amount of the one or more compounds, oligomers or prepolymers having reactive isocyanate groups in the composition applied is chosen such that a layer of one or more compounds, oligomers or prepolymers having reactive isocyanate groups can be reasonably efficiently deposited on the layer of one or more epoxy resins. Preferably the amount of the one or more compounds, oligomers or prepolymers having reactive isocyanate groups in the composition applied to the layer of the one or more epoxy resins is about 10 percent by weight or greater and most preferably about 15 percent by weight or greater. Preferably the amount of the one or more compounds, oligomers or prepolymers having reactive isocyanate groups in the composition applied to the surface of the one or more epoxy resins is about 30 percent by weight or less and most preferably about 25 percent by weight or less.

The composition containing the one or more compounds, oligomers or prepolymers having reactive isocyanate groups further comprise one or more volatile solvents or dispersants. The solvents or dispersants can be any liquid which dissolves or forms stable dispersion of one or more compounds, oligomers or prepolymers having reactive isocyanate groups, volatilizes in a reasonably rapid manner under application conditions and which does not interfere in adhesion of the one or more one or more compounds, oligomers or prepolymers having reactive isocyanate groups to the layer comprising one or more epoxy resins and to materials containing polar reactive groups. Preferably the one or more solvents or dispersants are organic. Preferred organic solvents or dispersants include ketones and preferably methyl ethyl ketone. The solvent or dispersant is present in sufficient amount to dissolve or disperse the one or more compounds, oligomers or prepolymers having reactive isocyanate groups. The solvent or dispersant is present in an amount such that it can volatilize away in a reasonably rapid manner after application and leave a discrete layer of one or more one or more compounds, oligomers or prepolymers having reactive isocyanate groups, and optionally a film forming resin, on the layer of one or more epoxy resins. The amount of solvent or dispersant present in the dispersion or solution is about 50 percent by weight or greater, more preferably about 60 percent by weight or greater and most preferably about 65 percent by weight or greater. The amount of solvent or dispersant present in the solution or dispersion is about 75 percent by weight or less and most preferably about 70 percent by weight or less.

The composition containing the one or more compounds, oligomers or pre-polymers having reactive isocyanate groups may further comprise one or more film forming resins. The film forming resin is preferably a high molecular weight resin. The film forming resins are present for the purpose of forming a film which provides strength to the composition of the invention when deposited on the surface of a substrate. Any high molecular weight resin which forms a film upon evaporation of the solvent may be used. The high molecular weight resin can have functional groups which react with the adhesive system or coating system, or which react with the surface of the substrate. Alternatively, reactive functional groups are not required for the high molecular weight resin to work in the compositions of the invention. Examples of preferred film-forming resin are resins containing one or more functional groups comprising vinyl, acrylate, styrenic, diene, methacrylate, allyl, thiolene, vinyl ether, unsaturated ester, imide, N-vinyl, acrylamide containing groups, mixtures thereof and the like. Preferred functional groups are acrylate functional groups. The resins preferably have a molecular weight which facilitates the formation of a strong film upon evaporation of the solvent. Preferably the film forming resins have an weight average molecular weight of about 5,000 or greater, more preferably about 10,000 or greater and most preferably about 15,000 or greater. Preferably the film forming resins have a weight average molecular weight of about 200,000 or less, more preferably about 150,000 or less and most preferably about 100,000 or less. The film forming resins are present in sufficient amount to form a film on the substrate. Preferably the film forming resin is present in an amount of about 0 percent by weight or greater and most preferably about 1 percent by weight or greater. Preferably the film forming resin is present in an amount of about 8 percent by weight or less and most preferably about 3 percent by weight or less.

The composition containing the one or more compounds, oligomers or prepolymers having reactive isocyanate groups may further comprise one or more reinforcing fillers to give the deposited layer enhanced strength. Any reinforcing filler which enhances the strength of the layer may be utilized. Exemplary reinforcing fillers include one or more carbon blacks. The carbon black may be a standard carbon black which is not specially treated to render it nonconductive, that is not specifically surface treated or oxidized. One or more nonconductive carbon blacks may be used in conjunction with the standard carbon black, although such inclusion may add unnecessary costs. The amount of reinforcing filler in the composition is that amount which provides the desired strength. The reinforcing filler is preferably used in the amount of about 0 percent by weight or greater based on the weight of the composition, more preferably about 2 percent by weight or greater and most preferably about 4 percent by weight or greater. The carbon black is preferably about 20 percent by weight or less based on the weight of the composition, more preferably about 15 percent by weight or less and most preferably about 12 percent by weight or less. Standard carbon blacks are well known in the art and include RAVEN™ 790, 450, 500, 430, 420 and 410 carbon blacks available from Colombian and CSX™ carbon blacks available from Cabot, and Printex™ 30 carbon black available from Degussa. Nonconductive carbon blacks are well known in the art and include Raven™ 1040 and 1060 carbon black available from Colombian.

The composition containing the one or more compounds, oligomers or pre-polymers having reactive isocyanate groups may further comprise one or more fillers. One preferred group of fillers useful in the invention are fillers that impart a balance of cost and viscosity to the composition. Among fillers useful for this purpose are talc, calcium carbonates, and kaolin. Such fillers are preferably non-pigmented fillers and are used in a sufficient amount to impart an acceptable balance of viscosity and cost to the formulation and to achieve the desired properties of the composition. Preferred fillers include talc. Preferably, the filler is present in an amount sufficient to render the rheology of the composition suitable for application. Preferably, the filler is present in an amount of about 1 part by weight or greater based on the weight of the composition and most preferably about 5 parts by weight or greater. Preferably, the non pigmented filler is present in an amount of about 20 parts by weight or less based on the weight of the composition and most preferably about 15 parts by weight or less.

Either of the compositions deposited may further contain a component that fluoresces when illuminated by ultraviolet light. Fluorescing components are readily available from numerous sources, for example Aldrich Chemical Co., Milwaukee, Wis. As a specific example, the fluorescing component can be Uvitex OB brand fluorescing agent available from Ciba Specialty Chemicals, Tarrytown, N.Y. (USA). The amount of fluorescing agent added to the compositions must be sufficient so that the area of the plastic substrate treated with the composition is apparent when is illuminated with an ultraviolet light.

The compositions for depositing the layers on the surface of the polyolefin substrate may be prepared by contacting the ingredients and blending. The processes and equipment for achieving this are well known to those skilled in the art. The materials are contacted under conditions such that a stable solution or dispersion is prepared. Any equipment and processes which provides this result may be used. The materials may be contacted at about ambient temperature (about 20-25° C.) to about 60° C. and preferably at ambient temperature. The components may be blended in air and preferably blended in a dry environment to improve the hydrolytic stability of the composition. The materials are blended for a sufficient time to prepare a stable solution or dispersion. The compositions for depositing the layers on the surface of the polyolefin substrate may be applied to polyolefin substrates by any means known to those skilled in the art. It may be applied in conventional means such as using a brush, roller, sprayed onto the surface, ink jet printing, screen printing and the like. Preferably, the composition can be applied using robotic application devices, well known to those skilled in the art.

After application of the composition containing one or more epoxy resins to the polyolefin structure, the solvent or dispersant is allowed volatilized away from the layer of one or more epoxy resins deposited on the surface of the polyolefin substrate. The time between the application of the composition containing one or more epoxy resins to the polyolefin structure and the application of the composition containing the one or more compounds, oligomers or prepolymers having reactive isocyanate groups to the layer of the one or more epoxy resins, the flash off time, is sufficient to allow the solvent or dispersant to volatilize away. Preferably the flash off time is about 15 minutes or greater, more preferably 60 minutes or greater and most preferably about 90 minutes or greater. Preferably the flash off time is about 820 minutes or less, more preferably 360 minutes or less and most preferably about 120 minutes or less.

After application of the composition containing one or more compounds, oligomers or prepolymers having reactive isocyanate groups to the layer comprising one or more epoxy resins the solvent or dispersant is allowed volatilized away from the layer comprising one or more compounds, oligomers or prepolymers having reactive isocyanate groups deposited on the layer of one or more epoxy resins. The time between the application of the composition containing one or more compounds, oligomers or prepolymers having reactive isocyanate groups to the layer comprising and any other operation such as contacting with a material containing polar reactive groups, the open time, is sufficient to allow the solvent or dispersant to volatilize away. Preferably, the solvent or dispersant composition comprising one or more compounds, oligomers or prepolymers having reactive isocyanate groups and one or more volatile solvents is allowed to flash off for about 30 to about 90 minutes after application to the epoxy resin containing layer. Preferably the open time is about 30 minutes or greater, more preferably 48 hours or greater and most preferably about 72 hours or greater. Preferably the open time is about 110 hours or less, more preferably 90 hours or less and most preferably about 48 hours or less.

In another embodiment the invention is a system or kit comprising one or more polyolefin structures having deposited on one or more surfaces a layer comprising one or more epoxy resins and having deposited on the layer comprising one or more epoxy resins a layer comprising one or more one or more compounds, oligomers or prepolymers having reactive isocyanate groups and one or more materials containing polar reactive groups. Preferably the material containing polar reactive groups is an adhesive or coating. Polar reactive groups as used herein mean any group that reacts with isocyanate groups. Included in polar reactive groups are isocyanate groups, and active hydrogen containing groups. For the purposes of this invention, an active hydrogen containing moiety refers to a moiety containing a hydrogen atom which, because of its position in the molecule, displays significant activity according to the Zerewitnoff test described by Wohler in the *Journal of the American Chemical Society*, Vol. 49, p. 3181 (1927). Illustrative of such active hydrogen moieties are carboxylic acid (—COOH), hydroxyl (—OH), primary amino (—NH$_2$), secondary amine (—NH—), primary amido (—CONH$_2$), thiol (—SH), and secondary amido (—CONH—) groups. Preferable active hydrogen containing groups include hydroxyls, primary amino, secondary amino and thiol groups. Preferred polar reactive groups are isocyanates and active hydrogen containing groups, with isocyanate groups most preferred.

In one embodiment the material containing polar reactive groups is a coating. Any coating that contains polar reactive groups and provides the desired properties to a polyolefin substrate may be used in the systems, or kits of the invention. Such coatings may contain pigments or dyes. Such coatings may be clear or opaque. The coatings may contain ingredients well known in the art.

In another embodiment the material with polar reactive groups may be an adhesive. Any adhesive that contains polar reactive groups that react with isocyanate groups may be used in the systems or kits of the invention. More preferred adhesives contain isocyanate or active hydrogen containing groups. The kits may further comprise primers useful with such adhesives. Generally such primers are adapted to prime the surface of the other substrates to which the polypropylene substrates are bonded.

Isocyanate based (polyurethane or polyurea forming) adhesive systems comprise an isocyanate functional component. An isocyanate functional component contains one or more compounds having on average more than one isocyanate functional group per molecule. The isocyanate functional compound can be any compound which contains on average more than one isocyanate moiety. The isocyanate functional compound can be in the form of an isocyanate functional prepolymer or in the form of a monomer or oligomer having on average greater than 1 isocyanate group, and preferably 2 or more isocyanate groups. The isocyanate prepolymer can by any prepolymer prepared by reaction of an isocyanate functional compound with one or more compounds having on average more than one isocyanate reactive functional groups, such as hydroxyl, amine, thiol, carboxyl and the like under conditions such that the prepolymer prepared have on average more than one isocyanate moiety (group) per molecule. Polyisocyanate based systems can be one part or two-part systems. In a one-part system the isocyanate functional component further comprises a catalyst and other components as described hereinafter. The one component systems typically cure by moisture curing. Once formulated the one-part adhesives are packaged in air and moisture proof containers to prevent curing before application. In another embodiment, the adhesive system used in the invention is a two-part polyisocyanate containing adhesive system. The two parts are reactive with one another and when contacted have adhesive properties and undergo a curing reaction wherein the composition is capable of bonding substrates together. One part of the composition comprises, or contains, an isocyanate functional component. This is typically referred to as the resin side or A side. The other component of the composition is an isocyanate reactive component which contains one or more compounds, oligomers or prepolymers having on average more than one group reactive with isocyanate moieties as described herein. The second part is commonly known as the curative or B side. Compounds having on average one or more isocyanate reactive groups can be prepolymers or small chain compounds such as difunctional chain extenders or polyfunctional crosslinking agents known in the art. The chain extenders and crosslinking agents have a molecular weight of about 250 Daltons or less. A catalyst may be utilized in the curative side. The reaction product is a cured product which is capable of bonding certain substrates together. Preferable poly-isocyanates for use in such prepolymers are described hereinbefore More preferred isocyanates are aromatic isocyanates, alicyclic isocyanates and derivates thereof. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocylohexyl)methane, and trimethyl hexamethylene diisocyanate. The most preferred isocyanate is diphenylmethane diisocyanate. Preferable polyols useful in the preparation of the prepolymers include those disclosed in Wu, U.S. Pat. No. 6,512,033 at column 4, line 10 to line 64, incorporated herein by reference, and include polyether polyols, polyester polyols, poly(alkylene carbonate)polyols, hydroxyl containing polythioethers, polymer polyols (dispersions of vinyl polymers in such polyols, commonly referred to as copolymer polyols) and mixtures thereof. Preferably, the isocyanate-reactive compound has a functionality of at least about 1.5, more preferably at least about 1.8, and is most preferably at least about 2.0; and is preferably no greater than about 4.0, more preferably no greater than about 3.5, and is most preferably no greater than about 3.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500. The isocyanate functional prepolymers for use in the isocyanate functional adhesive systems preferably exhibit an average isocyanate functionality of at least about 2.0 and a molecular weight of at least about 500 and more preferably about 1,000. Preferably, the average isocyanate functionality of the prepolymer is at least about 2.0, and is more preferably at least about 2.2. Preferably, the isocyanate functionality is no greater than about 4.0, more preferably, no greater than about 3.5 and most preferably, no greater than about 3.0. Preferably, the weight average molecular weight of the prepolymer is at least about 2,500, and is more preferably at least about 3,000; and is preferably no greater than about 40,000, even more preferably, no greater than about 20,000, and is most preferably no greater than about 10,000. The prepolymer may be prepared by any suitable method, such as by reacting compounds having two or more groups reactive with isocyanate groups, such as the polyols or polyamines, with an excess over stoichiometry of a polyisocyanate under reaction conditions sufficient to form the corresponding prepolymer, bulk polymerization and solution polymerization. The reaction to prepare the prepolymer is carried out under anhydrous conditions, preferably under an inert atmosphere, such as a nitrogen blanket, to prevent cross-linking of the isocyanate groups by atmospheric moisture. The reaction is catalyzed by a catalyst for the reaction of isocyanate groups with isocyanate reactive groups. Examples of such include the stannous salts of carboxylic acids, such as stannous octoate, stannous oleate, stannous acetate, and stannous laurate; dialkyltin dicarboxylates, such as dibutyltin dilaurate and dibutyltin diacetate, tertiary amines and tin mercaptides. Preferably, the reaction to prepare the prepolymer is catalyzed by stannous octoate. The amount of catalyst employed is between about 0.005 and about 5 percent by weight of the mixture catalyzed, depending on the nature of the isocyanate. The reaction is preferably carried out at a temperature between about 0° C. and about 150° C., more preferably between about 25° C. and about 80° C., until the residual isocyanate content determined by titration of a sample is very close to the desired theoretical value. Examples of useful isocyanate functional adhesive systems are disclosed in U.S. Pat. Nos. 4,374,237, 4,687,533, 4,780,520, 5,063,269, 5,623,044, 5,603,798, 5,852,137, 5,976,305, 5,852,137, 6,512,033, relevant portions incorporated herein by reference. Examples of commercial adhesives which may be used herein are BETASEAL™ 15626, 57302, 1712, 1756 adhesives available from The Dow Chemical Company. EFBOND™ windshield adhesives available from Eftec, WS 151™, WS212™ adhesives available from Yokohama Rubber Company, and SIKAFLEX™ adhesives available from Sika Corporation.

For two-part isocyanate based adhesive systems, the isocyanate content in the prepolymers is preferably in the range of about 6 percent to about 35 percent by weight, more preferably in the range of about 8 percent to about 30 percent by weight and most preferably in the range of about 10 percent to about 25 percent by weight. For one-part moisture curable systems, the isocyanate content in the prepolymers is preferably in the range of about 0.1 percent to about 10 percent, more preferably in the range of about 1.5 percent to about 5.0 percent and most preferably in the range of about 1.8 percent to about 3.0 percent. The isocyanate functional adhesive compositions useful in the invention may further comprise a polyfunctional isocyanate for the purpose of improving the modulus in the cured form. "Polyfunctional" as used in the context of the isocyanates refers to isocyanates having a functionality of 2.2 or greater. The polyisocyanates can be any monomeric, oligomeric or polymeric isocyanate having a nominal functionality of about 2.2 or greater. The isocyanate functional adhesive systems further comprise one or more catalysts for the reaction of isocyanate functional groups with isocyanate reactive groups wherein the catalyst may be located in the isocyanate functional group containing component or the isocyanate reactive component. Preferably, for two-part adhesive systems, the catalyst is located in the isocyanate reactive component to improve the stability of the two component system. The catalyst can be any catalyst known to the skilled artisan for the reaction of isocyanate groups with active hydrogen containing compounds. Among preferred catalysts are organotin compounds, metal alkanoates, tertiary amines and diazabicyclo compounds. The catalyst is utilized in a sufficient amount to cause the isocyanate groups to react with the isocyanate reactive groups at a reasonable rate. The amount of catalyst utilized depends on the choice of catalyst and the reaction rate desired. The isocyanate functional adhesive compositions may further comprise one or more low molecular weight compounds having two or more isocyanate reactive groups and a hydrocarbon backbone wherein the backbone may further comprise one or more heteroatoms. It is advantageous to use such low molecular weight compounds, for example difunctional chain extenders and crosslinkers have, on average, greater than two active hydrogen groups per compound, in two-part compositions. In a two-part isocyanate functional adhesive system, the curative part may further comprise polyoxyalkylene polyamine having 2 or greater amines per polyamine. Preferably, the polyoxyalkylene polyamine has 2 to 4 amines per polyamine and most preferably 2 to 3 amines per polyamine. Preferably, the polyoxyalkylene polyamine has a weight average molecular weight of about 200 or greater and most preferably about 400 or greater. Preferably, the polyoxyalkylene polyamine has a weight average molecular weight of about 5,000 or less and most preferably about 3,000 or less. Among preferred polyoxyalkylene polyamines are JEFFAMINE™ D-T-403 polypropylene oxide triamine having a molecular weight of about 400 and JEFFAMINE™ D-400 polypropylene oxide diamine having a molecular weight of about 400. The two parts of the adhesive system are preferably combined such that the equivalents of isocyanate groups are greater than the equivalents of the isocyanate reactive groups. More preferably, the equivalents ratio of isocyanate groups to equivalents of isocyanate reactive groups is greater than about 1.0:1.0, even more preferably about 1.05:1.0 or greater and most preferably about 1.10:1.0 or greater. More preferably, the equivalents ratio of isocyanate groups to isocyanate reactive groups is about 2.0:1.0 or less, and most preferably about 1.40:1.0 or less.

One-part polyisocyanate functional adhesive systems and either or both of the resin part and the curative part for two-part isocyanate functional systems may contain plasticizers, fillers, pigments, stabilizers and other additives commonly present in curable polyurethane forming adhesives. By the addition of such materials, physical properties such as rheology, flow rates and the like can be modified. However, to prevent premature hydrolysis of the moisture sensitive groups of the isocyanate functional component, fillers should be thoroughly dried before admixture therewith. The compositions of the invention may include ultraviolet stabilizers and antioxidants and the like. Included among useful fillers are clays, alumina, limestone, talc, calcium carbonate and expanded perlites. Preferred clays useful in the invention include kaolin, surface treated kaolin, calcined kaolin, aluminum silicates and surface treated anhydrous aluminum silicates. The fillers can be used in any form which facilitates formulation of a pumpable adhesive. Preferably, the fillersis admixed in the form of pulverized powder, spray-dried beads or finely ground particles. Fillers may be used in an amount of about 0 percent by weight or greater of the adhesive system, more preferably about 5 percent by weight or greater and even more preferably about 10 percent by weight or greater. Preferably, the fillers are used in an amount of about 70 percent by weight or less of the adhesive system and more preferably about 60 percent by weight or less. Plasticizers are included so as to modify the rheological properties to a desired consistency. Such materials should be free of water, inert to isocyanate groups and compatible with the polymers present. Suitable plasticizers are well known in the art and preferable plasticizers include alkyl phthalates, such as diisononylphthalate or diisodecylphthalate, partially hydrogenated terpenes, trioctyl phosphate, toluene-sulfamide, esters of alkylsulfonic acid, adipic acid esters, castor oil, toluene and alkyl naphthalenes. The amount of plasticizer in each part of the curable composition is that amount which gives the desired rheological properties. The amounts disclosed herein include those amounts added during preparation of the isocyanate containing prepolymer and during compounding of the curable composition. Preferably, plasticizers are used in the adhesive system in an amount of about 0 percent by weight or greater based on the weight of the adhesive system, more preferably about 5 percent by weight or greater and most preferably about 10 percent by weight or greater. The plasticizer is preferably used in an amount of about 45 percent by weight or less based on the weight of the adhesive system and more preferably about 40 percent by weight or less. The adhesives used in this invention may further comprise stabilizers, which function to protect the adhesive composition from moisture, thereby inhibiting advancement and preventing premature crosslinking of the isocyanates in the curable formulation. Stabilizers known to the skilled artisan for isocyanate functional adhesive systems may be used herein. Included among such stabilizers are diethylmalonate, alkylphenol alkylates, paratoluene sulfonic isocyanates, benzoyl chloride and orthoalkyl formates. Such stabilizers are preferably used in an amount of about 0.1 percent by weight or greater based on the total weight of the adhesive system, preferably about 0.5 percent by weight or greater and more preferably about 0.8 percent by weight or greater. Such stabilizers are used in an amount of about 5.0 percent by weight or less based on the weight of the adhesive system, more preferably about 2.0 percent by weight or less and most preferably about 1.4 percent by weight or less. The adhesives useful in this invention may further comprise an adhesion promoter, such as those disclosed in Mandi, U.S. Patent Publication 2002/0100550 paragraphs 0055 to 0065 and Hsieh, U.S. Pat. No. 6,015,475 column 5, line 27 to column 6, line 41, incorporated herein by reference. The amounts of such adhesion promoters useful are also disclosed in these references and incorporated herein by reference. In another embodiment, the adhesive system may comprise both isocyanate functional groups and alkoxy siloxane groups. Such adhesive systems can be prepared by blending prepolymers having isocyanate functional groups and prepolymers containing alkoxy siloxane functional groups, such as disclosed in Zhu, U.S. Pat. No. 7,345,130, incorporated herein by reference, or by forming prepolymers having both isocyanate and alkoxy siloxane functional groups as disclosed in Hsieh, U.S. Pat. No. 6,015,475 in the passages cited above. The one-part isocyanate functional adhesives useful in this invention may further comprise a hydrophilic material that functions to draw atmospheric moisture into the composition. Optionally, the curable composition may further comprise a thixotrope (rheological additive). Such thixotropes are well known to those skilled in the art and include fumed silica, calcium carbonate, carbon black and the like. The thixotrope may be added to the composition in a sufficient amount to give the desired rheological properties. Preferably, the thixotrope is present in an amount of about 0 percent by weight or greater based on the weight of the adhesive system, preferably about 1 part by weight or greater. Preferably, the optional thixotrope is present in an amount of about 10 percent by weight or less based on the weight of the adhesive system and more preferably about 2 percent by weight or less. The formulations may further comprise known additives such as heat stabilizers and antioxidants known to the skilled artisan.

The adhesives useful in this invention may be formulated by blending the components together using means well known in the art, for example in a suitable mixer. Such blending is preferably conducted in an inert atmosphere in the absence of oxygen and atmospheric moisture to prevent premature reaction. It may be advantageous to add plasticizers to the reaction mixture for preparing the isocyanate containing component so that such mixtures may be easily mixed and handled. Alternatively, the plasticizers can be added during blending of all the components. Preferably, the components are blended at a temperature of about 20° C. to about 100° C., more preferably about 25° C. to about 70° C. Preferably, the materials are blended under vacuum or an inert gas, such as nitrogen or argon. The ingredients are blended for a sufficient time to prepare a well blended mixture, preferably from about 10 to about 60 minutes. Once the parts of the adhesive composition are formulated, they are packaged in a suitable container such that they are protected from atmospheric moisture and oxygen. Contact with atmospheric moisture could result in premature crosslinking of the isocyanate containing component.

In use, the components of two-part adhesive compositions are blended as would normally be done when working with such materials. For a two-part adhesive to be most easily used in commercial and industrial environments, the volume ratio at which the two parts are combined should be a convenient whole number. This facilitates application of the curable composition with conventional, commercially available dispensers including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or SULZER™ QUADRO of Sulzer Ltd., Switzerland. Typically, these dispensers use a pair of tubular receptacles arranged side-by-side with each tube being intended to receive one of the two parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended polymerizable composition is extruded from the mixing chamber onto a substrate. When using electrically-driven equipment, dynamic mixing may be used. Once the tubes have been emptied, they can be replaced with fresh tubes and the application process continued. The volumetric ratio at which the two parts of the polymerizable composition are combined is controlled by the diameter of the tubes. (Each plunger is sized to be received within a tube of fixed diameter, and the plungers are advanced into the tubes at the same speed.) A single dispenser is often intended for use with a variety of different two-part polymerizable compositions and the plungers are sized to deliver the two parts of the polymerizable composition at a convenient mix ratio. Some common mix ratios are 1:1, 2:1, 4:1 and 10:1; preferably at a mix ratio of about 1:1.

The adhesive composition is applied to the polyolefin structure at the location wherein the two layers was previously applied and the adhesive composition on the first substrate is thereafter contacted with a second substrate. The two layers can be applied to one of more of the surface of the polyolefin structures prior to the time the adhesive is applied to each substrate. Generally, the adhesive is applied at a temperature at which the adhesive can be pumped. Preferably, the adhesive is applied at a temperature of about 10° C. or greater for application, more preferably at a temperature of about 18° C. or greater. Preferably, the adhesive system is applied at a temperature of about 40° C. or less and more preferably at a temperature of about 35° C. or less. Two-part adhesive compositions start to cure upon mixing the two parts. One-part moisture curable compositions begin to cure upon exposure to ambient moisture. Curing can be accelerated by applying heat to the curing adhesive by means of induction heat, convection heat, microwave heating and the like. For moisture curable adhesives, the speed of cure can be enhanced by addition of moisture to the atmosphere or by performing the cure in a humidity chamber. Preferably, the curable adhesive system is formulated to provide a working time of at least about 3 minutes or greater and more preferably about 5 minutes or greater. "Working time" means the time after contacting the two parts or application of a one-part moisture cure adhesive until the adhesive starts to become a high viscous paste and is not subject to deformation during assembly to conform to the shape of the second substrate and to adhere to it.

In some embodiments, the material containing polar groups, such as coatings or adhesives, is applied to the one or more surfaces of the polyolefin structure shortly after application of the epoxy resin containing layer and the layer of the composition containing isocyanate functional groups. The minimum time between application of the two layers and application of the material containing polar groups is that time necessary for the solvent from the layer of the composition containing isocyanate functional groups to volatilize away. In some embodiments, the material containing polar functional groups may be applied in a different location from the location of application of the epoxy resin containing layer and the layer of the composition containing isocyanate functional groups, for instance in a different part of the plant or a different plant. Further, the plants can be many miles apart, for instance hundreds or thousands of miles apart. The material containing polar reactive groups may be applied at a time much later than the application of the epoxy resin containing layer and the layer of the composition containing isocyanate functional groups. The time period between application of the disclosed materials can be any time period wherein the material containing polar groups can form a durable bond with the layer of the composition containing isocyanate functional groups. In some embodiments, the time between application of the epoxy resin containing layer and the layer of the composition containing isocyanate functional groups and the material containing polar groups can be about 5 days or greater or even 30 days or greater. The time period between application of the time between application of the epoxy resin containing layer and the layer of the composition containing isocyanate functional groups and the material containing polar groups (the adhesive composition) can be about 90 days or less and preferably 60 days or less. As used herein, the term "durable bond" refers to the bond of the material containing polar groups to the layer of the composition containing isocyanate functional groups on the surface of the polyolefin structure wherein the bond lasts for a significant portion of the life, or the entire life, of the structure.

SPECIFIC EMBODIMENTS OF INVENTION

The following examples are included for illustrative purposes only and are not intended to limit the scope of the invention. Unless otherwise stated, all parts and percentages are by weight.

Sample Preparation

The surface of polypropylene samples (25.4×101.6 mm (1×4 inches)) are cleaned with isopropyl alcohol using dry paper. The epoxy resin solvent composition (epoxy resin composition) and the composition comprising one or more compounds, oligomers or prepolymers having reactive isocyanate groups (isocyanate composition) and a solvent are applied using squeeze bottle applicators having felt at the opening wherein the composition flows through the felt and is applied to surfaces using the felt. The epoxy resin solvent composition is applied to the surface of polypropylene structures at a wet thickness of about 25 micrometers, which gives a dry thickness of about 7 micrometers. The composition comprising one or more compounds, oligomers or prepolymers having reactive isocyanate groups and a solvent is applied at a wet thickness of about 90 micrometers, which results in a dry layer of 20 micrometers. Dry layer means the solvent is removed. The compositions are applied in one direction to obtain uniform smooth films. The open time between application of the epoxy resin composition and the isocyanate composition is 15 minutes. Coated metal substrates used in lap shear testing with the polypropylene samples are wiped with isopropyl alcohol to clean the surface.

Lap shear test specimens are prepared from the polypropylene samples and coated metal samples (25.4×101.6 mm (1×4 inches)). An adhesive bead approximately 6.3 mm wide by 8 mm high is applied along the width of the polypropylene samples (25 mm×75 mm) and approximately 6 mm to 12 mm from the end. The coated metal is immediately placed on the adhesive (a moisture curing isocyanate functional one part adhesive) such that the adhesive thickness is about 3 mm. The sample is allowed to cure at the condition of the 23° C. and 50 percent relative humidity for 72 hours.

Exposure Conditions

After the initial 72 hour cure some samples are further exposed to additional conditions. As used hereinafter, when samples are tested after initial curing only this will be referred to as Initial. The exposure conditions utilized are described in Table 1.

| Reference | Exposure Conditions |
| --- | --- |
| Cataplasma | As described herein after |
| Heat age | 500 Hours at 90° C. |
| Humidity | Exposure to 38° C. at 90 percent relative humidity (RH) for stated time |
| Thermal Cycles | Three cycles of 24 hours at 90° C., 24 hours at 38° C. and 90 percent relative humidity and 24 hours at −40° C. |

Test Methods—Cataplasma

The samples are stored in a climatic chamber at 70° C., 100 percent relative humidity, for 7 days, or wrapped in cotton wool, humidified with sufficient water and sealed in a polyethylene bag to be held thereafter in an oven at 70° C. for 7 days. Next, the samples are placed in a freezer for 16 hours at −20° C., after which the sample is allowed to stand at room temperature for 2 hours. The cycle is repeated multiple times after which the samples are removed from the bag.

Quick Knife Adhesion Test:

The quick knife adhesion test is performed by applying the compositions on a substrate as described below and thereafter applying a bead of adhesive with a defined geometry of 10 mm (height)×10 to 15 mm width×200 mm length. The adhesive is compressed to a height of about 6 mm. The structure is exposed to conditions as detailed hereinafter. To evaluate adhesion performance, the adhesive strip is cut on edge approximately 10 mm parallel to the substrate and peeled off in a 90 degree angle. Approximately each 10 mm, the peeled off bead is cut with a knife to the substrate and the peeling is continued. The peeled samples are rated according to the percent of cohesive failure, meaning failure within the hardened bulk of the adhesive, using the scale 1=approximately 0 percent cohesive failure, 2=approximately 25 percent cohesive failure, =approximately 50 percent cohesive failure, 4=approximately 75 percent cohesive failure, 5=approximately 100 percent cohesive failure. The most commonly used notations are a=adhesive exhibits delamination from the substrate, b=adhesive exhibits delamination from the primer, z=adhesive failure at both edges (left and right side) of the adhesive bead and e=tacky interface between either adhesive/ primer or adhesive/substrate. Peel adhesion ratings of about 4 or greater (75 percent cohesive failure or greater) are considered acceptable.

Lap Shear Test

The samples are pulled at a rate of 1 inch/minute (2.5 cm/min) with an Universal Machine Instron Tester. The load at break of the sample is recorded and the average of the three tests is reported.

Test Result Legends

The legends to described the observed results are compiled in Table

| Legend | Observation |
|--------|-------------|
| CF-PU  | Cohesive failure in the polyurethane adhesive the break occurs in the adhesive |
| AF-PU  | Adhesive failure of the polyurethane adhesive, generally to the adhesion promoting layer |
| AF-BP  | Adhesive failure of the adhesion promoting layer to polypropylene |
| PPB    | Polypropylene breaks |
| CF-BC  | Cohesive failure of the base coat, delamination of the paint |

Materials

Epoxy resin composition-reaction product of bisphenol A and epichlorohydrin, number average molecular weight of about 700, about 3.5 percent (plus or minus 1 percent), toluene about 55 percent (plus or minus 5 percent), xylene about 35 percent (plus or minus 5 percent), ethyl benzene about 5 percent, acetone or propanone about 2 percent and n-butyl acetate about 2.5 percent.

Composition containing isocyanate functional groups—about 20 percent by weight (plus or minus 5 weight percent) of diphenylmethane diisocyanate, isomers and homologues; less than about 5 percent 4,4'-methylenediphenyl diisocyanate, less than about 5 percent by weight of carbon black, about 10 percent by weight of polyester (plus or minus 5 percent by weight); methyl ethyl ketone 45 percent by weight (plus or minus 5 percent by weight); acetone 10 to 20 percent by weight and talc about 10 percent by weight (plus or minus 5 percent by weight).

BEATSEAL™ 57302 adhesive—a one component isocyanate functional adhesive containing polyurethane prepolymers having isocyanate reactive groups, available from The Dow Chemical Company, Midland Mich.

BEATSEAL™ 1712BN adhesive—a one component isocyanate functional adhesive containing polyurethane prepolymers having isocyanate reactive groups, available from The Dow Chemical Company, Midland Mich.

BEATSEAL™ 1756BN adhesive a one component isocyanate functional adhesive containing polyurethane prepolymers having isocyanate reactive groups which is warm applied and exhibits quick fix properties, available from Dow Chemical, Midland Mich.

EXAMPLES 1 AND 2

Two polypropylene substrates in the form of lap shear coupons are treated by depositing a layer of the epoxy resin composition and the composition containing isocyanate functional groups on one surface of substrates as described above. The polypropylene coupons are then exposed to different conditions for varied times. Thereafter the polypropylene coupons are bonded to metal lap shear coupons coated with white DuPont Gen III paint using BEATSEAL™ 57302 adhesive as described above. The coupons are cured for 72 hours at 23° C. and 50 percent humidity. Samples are also prepared according to the quick knife adhesion test using BEATSEAL™ 57302 adhesive. Thereafter some of the samples are tested according to the quick knife adhesion test and some are tested according to the lap shear test. The conditions and the results are compiled in Table 2. The quick knife results are shown in percentage of failure mode and the lap shear results are shown in strength at break and percentage failure mode. The preferred mode of failure is cohesive failure of the adhesive. RT means room temperature 23° C. and 50 relative humidity. Each example uses a different polypropylene for the substrate.

TABLE 2

| Ex | Open Time Conditions | Days | Quick Knife Failure Mode | Lap Shear Strength MPa | Lap Shear Failure Mode |
|----|------------|------|--------------------------|------|------------------------|
| 1  | RT         | 10   | 100% CF-PU               | 5.0  | 95% AF-PU/5% CF-PU     |
| 1  | RT         | 20   | 85% CF-PU/15% PPB        | 4.2  | 90% AF-PU/10% CF-PU    |
| 1  | RT         | 30   | 60% CF-PU/40% PPB        | 5.9  | 70% CF-PU/30% AF-PU    |
| 1  | 90° C.     | 10   | 50% CF-PU/50% AF-PU      | 5.1  | 95% AF-PU/5% CF-PU     |
| 1  | 90° C.     | 20   | 80% CF-PU/20% PPB        | 4.8  | 95% AF-PU/5% CF-PU     |
| 1  | 90° C.     | 30   | 70% CF-PU/30% PPB        | 0.7  | 100% AF-PU             |
| 1  | Humidity   | 10   | 95% CF-PU/5% AF-PU       | 3.8  | 95% AF-PU/5% CF-PU     |
| 1  | Humidity   | 20   | 80% CF-PU/20% AF-PU      | 3.5  | 95% AF-PU/5% CF-PU     |
| 1  | Humidity   | 30   | 70% AF-PU/30% CF-PU      | 1.2  | 100% AF-PU             |
| 2  | RT         | 10   | 100% CF-PU               | 3.4  | 95% AF-PU/5% CF-PU     |
| 2  | RT         | 20   | 100% CF-PU               | 5.4  | 95% AF-PU/5% CF-PU     |
| 2  | RT         | 30   | 100% CF-PU               | 5.8  | 100% CF-PU             |
| 2  | 90° C.     | 10   | 50% CF-PU/50% AF-PU      | 2.9  | 80% AF-PU/30% CF-PU    |
| 2  | 90° C.     | 20   | 90% AF-PU/10% CF-PU      | 3.3  | 95% AF-PU/5% CF-PU     |
| 2  | 90° C.     | 30   | 95% CF-PU/5% PPB         | 1.3  | 100% AF-PU             |
| 2  | Humidity   | 10   | 95% CF-PU/5% AF-PU       | 3.4  | 70% AF-PU/30% CF-PU    |
| 2  | Humidity   | 20   | 90% AF-PU/10% CF-PU      | 2.7  | 95% AF-PU/5% CF-PU     |
| 2  | Humidity   | 30   | 95% AF-PU/5% CF-PU       | 1.0  | 100% AF-PU             |

EXAMPLES 3 AND 4

Polypropylene coupons of two different polypropylene compositions are prepared and tested as described in Examples 1 and 2.

TABLE 3

| Ex | Exposure Conditions | Quick Knife Failure Mode | Lap Shear MPa | Lap Shear Failure Mode |
|---|---|---|---|---|
| 3 | Initial cure | 100% CF-PU | 5.9 | 100% CF-PU |
| 3 | Cataplasma | 80% AF-PU/20% CF-PU | 5.5 | 100% CF-BC |
| 3 | 7 days at 90° C. | 100% CF-PU | 6.5 | 100% CF-PU |
| 4 | Initial cure | 100% CF-PU | 8.6 | 100% CF-PU |
| 4 | Cataplasma | 80% AF-PU/20% CF-PU | 1.3 | 100% CF-BC |
| 4 | 7 days at 90° C. | 60% CF-PU/40% PPB | 4.3 | 95% CF-PU/ 5% AF-PU |

EXAMPLES 5 TO 12

Eight polypropylene substrates in the form of lap shear coupons are treated by depositing a layer of the epoxy resin composition and the composition containing isocyanate functional groups on one surface of substrates as described above. Thereafter a bead of BEATSEAL™ 57302 adhesive is applied to prepare quick knife adhesion samples as described above. The coupons are cured for 72 hours at 23° C. and 50 percent humidity. Thereafter the samples are tested according to the quick knife adhesion test. The open exposure time period and the results are compiled in Table 4

TABLE 4

| Ex | Cond. | 10 days | 30 days | 50 days | 60 days |
|---|---|---|---|---|---|
| 5 | RT | 100% CF-PU | 100% CF-PU | 50% CF-BP/ 50% AF-BP | 95% CF-BP/ 5% AF-BP |
| 6 | RT | 100% CF-PU | 95% CF-PU/5% AF-BP | 70% CF-BP/ 30% AF-PU | 95% CF-BP/ 5% AF-BP |
| 7 | RT | 90% CF-PU/ 10% AF-BP | 90% CF-PU/ 10% AF-BP | 100% CF-PU | 80% CF-BP/ 20% AF-BP |
| 8 | RT | 95% CF-PU/ 5% AF-BP | 50% CF-PU/ 50% AF-BP | 85% AF-BP/ 15% CF-PU | 90% AF-BP/ 10% CF-PU |
| 9 | RT | 90% AF-BP/ 10% CF-PU | 50% CF-PU/ 50% AF-BP | 90% AF-BP/ 10% CF-PU | 90% AF-BP/ 10% CF-PU |
| 10 | RT | 100% CF-PU | 100% CF-PU | 70% CF-PU/ 30% AF-BP | 80% CF-BP/ 20% AF-BP |
| 11 | RT | 100% CF-PU | 100% CF-PU | 100% CF-PU | 80% CF-BP/ 20% AF-PU |
| 12 | RT | 90% CF-PU/ 10% AF-PU | 100% CF-PU | 100% CF-PU | 100% CF-PU |
| 5 | Humidity | 60% AF-PU/ 40% CF-PU | 90% AF-BP/ 10% CF-PU | 85% AF-BP/ 15% CF-PU | 100% AF-BP |
| 6 | Humidity | 100% CF-PU | 95% CF-PU/5% AF-PU | 85% AF-PU/ 15% CF-PU | 90% AF-BP/ 10% CF-PU |
| 7 | Humidity | 60% CF-PU/ 40% AF-BP | 50% AF-BP/ 50% CF-PU | 60% CF-PU/ 40% AF-BP | 50% CF-PU/50% AF-BP |
| 8 | Humidity | 85% AF-BP/ 15% CF-PU | 95% AF-BP/ 5% CF-PU | 100% AF-BP | 100% AF-BP |
| 9 | Humidity | 90% AF-BP/10% CF-PU | 100% AF-BP | 100% AF-BP | 100% AF-BP |
| 10 | Humidity | 60% CF-PU/ 40% AF-BP | 50% CF-BP/ 50% AF-BP | 90% AF-BP/ 10% CF-PU | 50% CF-PU/50% AF-BP |
| 11 | Humidity | 100% CF-PU | 95% CF-BP/5% AF-PU | 100% CF-PU | 100% CF-PU |
| 12 | Humidity | 100% CF-PU | 90% CF-BP/ 10% AF-PU | 80% CF-PU/ 20% AF-BP | 50% CF-PU/50% AF-BP |

Samples according to Examples 5 to 12 are exposed to 500 hours of humidity, 500 hours of heat aging or cataplasma. The samples are tested as described above and the results are compiled in Table 5.

TABLE 5

| Ex | Initial | Humidity | Heat Age | Cataplasma |
|---|---|---|---|---|
| 5 | 100% CF-PU | 95% CF-PU/5% AF-BP | 95% CF-PU/5% AF-BP | 90% CF-PU/10% AF-BP |
| 6 | 95% CF-PU/5% AF-BP | 70% CF-PU/30% AF-BP | 95% CF-PU/5% AF-PU | 70% CF-PU/30% AF-BP |
| 7 | 90% CF-PU/10% AF-BP | 80% CF-PU/20% AF-BP | 70% CF-PU/30% AF-BP | 95% CF-PU/5% AF-BP |
| 8 | 90% CF-PU/10% AF-BP | 100% AF-BP | 95% CF-PU/5% AF-BP | 60% CF-PU/40% AF-BP |
| 9 | 80% CF-PU/20% AF-BP | 95% AF-PU/ 5% CF-PU | 95% AF-BP/5% CF-PU | 100% AF-BP |

TABLE 5-continued

| Ex | Initial | Humidity | Heat Age | Cataplasma |
|---|---|---|---|---|
| 10 | 100% CF-PU | 50% CF-PU/50% AF-BP | 80% CF-PU/20% AF-PU | 95% CF-PU/5% AF-BP |
| 11 | 100% CF-PU | 100% CF-PU | 100% CF-PU | 100% CF-PU |
| 12 | 100% CF-PU | 100% CF-PU | 95% CF-PU/5% AF-BP | 100% CF-PU |

EXAMPLE 13 TO 15

Lap shear samples are prepared from three different polypropylene materials and metal coupons coated with three different coatings. Different lap shear samples are exposed to different conditions and then subjected to the lap shear testing. The paints used and the lap shear results are compiled in Table 6.

TABLE 6

| Ex | Condition | White/MPa | Silver/MPa | Yellow/MPa |
|---|---|---|---|---|
| 13 | Initial | 3.7 | 4.9 | 4.9 |
| 13 | Initial tested at 80° C. | 1.4 | 2.0 | 1.6 |
| 13 | 500 hours at 90° C. | 2.3 | 2.8 | 1.8 |
| 13 | 500 hours Humidity | 3.5 | 3.2 | 3.2 |
| 13 | 3 thermal cycles | 2.9 | 3.6 | 3.8 |
| 14 | Initial | 3.5 | 3.8 | 4.4 |
| 14 | Initial tested at 80° C. | 1.7 | 1.9 | 1.9 |
| 14 | 500 hours at 90° C. | 2.7 | 2.8 | 2.5 |
| 14 | 500 hours Humidity | 3.3 | 4.0 | 3.4 |
| 14 | 3 thermal cycles | 4.2 | 4.5 | 4.7 |
| 15 | Initial | 3.8 | 4.5 | 4.1 |
| 15 | Initial tested at 80° C. | 1.1 | 1.3 | 1.2 |
| 15 | 500 hours at 90° C. | 1.6 | 1.7 | 2.0 |
| 15 | 500 hours Humidity | 3.0 | 3.0 | 2.8 |
| 15 | 3 thermal cycles | 3.9 | 4.4 | 4.0 |

EXAMPLES 16 TO 27

In these examples a polypropylene containing 10 percent by weight of talc is used. The tested polypropylene structures are prepared as described above, for those samples marked not abraded. After wiping with isopropanol some samples are manually abraded using 180 grit paper until no evidence of gloss is evident. The polypropylene structures are treated by depositing a layer of the epoxy resin composition on one surface of substrates. Some samples are treated by depositing a layer of the epoxy resin composition and the composition containing isocyanate functional groups on one surface of structures as described above. Thereafter polypropylene coupons are bonded to metal lap shear coupons coated with white DuPont 1K while paint using BEATSEAL™ 57302 adhesive, BEATSEAL™ 1712BN adhesive, or BEATSEAL™ 1756BN adhesive as described above. The coupons are cured for 72 hours at 23° C. and 50 percent humidity. These samples are tested according to the lap shear test. Samples are also prepared according to the quick knife adhesion test using BEATSEAL™ 57302 adhesive BEATSEAL™ 1712BN adhesive or BEATSEAL™ 1756BN adhesive as described above and are tested according to the quick knife adhesion test. The conditions and the results are compiled in Table 7. The quick knife results are shown in percentage of failure mode and the lap shear results are shown in strength at break and failure mode.

TABLE 7

| Ex | Adhesive Code | Abraded | Layers | Quick Knife | Lap Shear MPa | Lap Shear Failure Mode |
|---|---|---|---|---|---|---|
| 16 | 57302 | No | epoxy only | 100% AF | 0.84 | 100% AF |
| 17 | 1712 | No | epoxy only | 100% AF | 1.60 | 100% AF |
| 18 | 1756 | No | epoxy only | 100% AF | 1.81 | 100% AF |
| 19 | 57302 | Yes | epoxy only | 100% AF | 0.10 | 100% AF |
| 20 | 1712 | Yes | epoxy only | 100% AF | 0.12 | 100% AF |
| 21 | 1756 | Yes | epoxy only | 100% AF | 0.15 | 100% AF |
| 22 | 57302 | No | epoxy and isocyanate | 100% CF | 4.26 | 100% CF |
| 23 | 1712 | No | epoxy and isocyanate | 100% CF | 6.39 | 100% CF |
| 24 | 1756 | No | epoxy and isocyanate | 100% CF | 6.08 | 100% CF |
| 25 | 57302 | Yes | epoxy and isocyanate | 100% CF | | |
| 26 | 1712 | Yes | epoxy and isocyanate | 100% CF | | |
| 27 | 1756 | Yes | epoxy and isocyanate | 100% CF | | |

EXAMPLES 28 TO 30

Lap shear samples are prepared as described above using the three listed adhesives and exposed to heat aging and cataplasma conditions. Thereafter the lap shear samples are tested. The bonded surfaces of the polypropylene are treated with an epoxy layer and a layer of the composition containing isocyanate reactive groups. The results are compiled in Table 8

TABLE 8

| Adhesive | Exposure conditions | Stress MPa | Failure mode |
|---|---|---|---|
| 57302 | Cataplasma | 3.6 | 100% CF-BC |
| 1712 | Cataplasma | 3.0 | 100% CF-BC |
| 1756 | Cataplasma | 2.8 | 100% CF-BC |
| 57302 | Heat aging | 4.0 | 100% CF |
| 1712 | Heat aging | 5.2 | 100% CF |
| 1756 | Heat aging | 5.1 | 100% CF |

What is claimed is:
1. An article comprising:
   a polyolefin substrate;
   disposed on one or more surfaces of the polyolefin substrate is a discrete layer having a dry thickness of about 1 μm to about 20 μm formed from one or more epoxy resins having an average epoxy functionality of greater than one; and
   disposed on the layer of the one or more epoxy resins is a discrete layer having a dry thickness of about 10 μm to about 25 μm of formed from one or more compounds, oligomers or prepolymers having reactive isocyanate groups and one or more fillers;
   and an adhesive layer disposed on the discrete layer formed from one or more compounds, oligomers or prepoly- mers having reactive isocyanate groups; wherein the adhesive has polar functional groups.

2. An article according to claim 1 wherein the discrete layer formed from the one or more compounds, oligomers or prepolymers having reactive isocyanate groups further comprises a film forming resin.

3. A kit comprising:
an article according to claim 1; and
one or more isocyanate functional adhesives.

4. A kit according to claim 3 which further comprises a primer for isocyanate functional adhesives.

5. An article according to claim 1 wherein the polyolefin substrate further comprises one or more reinforcing fibers, one or more fillers, one or more elastomers or mixtures thereof.

6. An article according to claim 1; wherein the polar functional groups of the adhesive are isocyanate or active hydrogen containing groups.

7. An article according to claim 6 further comprising a second substrate in contact with the adhesive.

8. An article according to claim 6 wherein a second substrate is in contact with the adhesive layer.

9. An article according to claim 1 wherein the one of more surfaces of the polyolefin substrate having the discrete layer formed from one or more epoxy resins and the discrete layer of formed from one or more compounds, oligomers prepolymers having reactive isocyanate groups deposited on the one of more surfaces forms a bond with the adhesive having polar functional groups having a lap shear strength of 2.0 MPa or greater according to SAE J1529 after curing for 168 hours at 23° C.

10. An article according to claim 1 wherein the polyolefin substrate is formed by one or more of injection molding, sheet forming, extrusion molding, vacuum molding, profile molding, foam molding, injection pressing, blow molding, thermoforming, compression molding, or rotational molding.

11. An article according to claim 1 wherein the one or more epoxy resins contain more than 1.5 epoxy groups per molecule and have a number average molecular weight of 150 to 10,000.

12. An article according to claim 11 wherein the one or more epoxy resins contain more than 2.0 epoxy groups per molecule.

13. An article according to claim 1 wherein the one or more compounds, oligomers or prepolymers having reactive isocyanate groups each containing on average 2 or greater isocyanate groups.

14. An article according to claim 13 wherein the discrete layer formed from one or more compounds, oligomers or prepolymers having reactive isocyanate groups further comprises one or more reinforcing fillers.

15. An article comprising:
a polyolefin substrate comprising one or more reinforcing fibers, one or more fillers, one or more elastomers or mixtures thereof formed by one or more of injection molding, sheet forming, extrusion molding, vacuum molding, profile molding, foam molding, injection pressing, blow molding, thermoforming, compression molding, or rotational molding;
disposed on one or more surfaces of the polyolefin substrate is a discrete layer having a dry thickness of about 1 μm to about 20 μm formed from one or more epoxy resins having an average epoxy functionality of greater than one; and
disposed on the epoxy resin layer is a discrete layer having a dry thickness of about 10 μm to about 25 μm formed from one or more compounds, oligomers or prepolymers having reactive isocyanate groups and a film forming resin;
and an adhesive layer disposed on the discrete layer formed from one or more compounds, oligomers or prepolymers having reactive isocyanate groups; wherein the adhesive has polar functional groups and a lap shear strength of 2.0 MPa or greater according to SAE J1529 after curing for 168 hours at 23° C.

16. An article according to claim 15 wherein the composition containing one or more compounds, oligomers or prepolymers having reactive isocyanate groups further comprises one or more fillers.

17. An article comprising:
a polyolefin substrate;
disposed on one or more surfaces of the polyolefin substrate is a discrete layer having a dry thickness of about 1 μm to about 20 μm formed from one or more epoxy resins having more than 1.5 epoxy groups per molecule and having a number average molecular weight of 150 to 10,000; and
disposed on the discrete layer of one or more epoxy resins is a discrete layer having a dry thickness of about 10 μm to about 25 μm formed from one or more compounds, oligomers or prepolymers each having on average two or more reactive isocyanate groups and a filler; and an adhesive layer disposed on the discrete layer formed from one or more compounds, oligomers or prepolymers having reactive isocyanate groups; and a second substrate in contact with the adhesive layer; wherein the adhesive contains isocyanate or active hydrogen groups.

* * * * *